(12) United States Patent
Green

(10) Patent No.: US 8,566,744 B2
(45) Date of Patent: Oct. 22, 2013

(54) SAME-DISPLAY COMPARISON OF CONTENT FOR DIFFERENT RENDITIONS OF A SINGLE COMPUTER PROGRAM

(75) Inventor: John Green, Burlingame, CA (US)

(73) Assignee: VMware, Inc., Palo Alto, CA (US)

( * ) Notice: Subject to any disclaimer, the term of this patent is extended or adjusted under 35 U.S.C. 154(b) by 347 days.

(21) Appl. No.: 12/855,431

(22) Filed: Aug. 12, 2010

(65) Prior Publication Data

US 2012/0042281 A1 Feb. 16, 2012

(51) Int. Cl.
*G06F 3/048* (2013.01)
*G06F 3/00* (2006.01)

(52) U.S. Cl.
USPC ............................ 715/810; 715/761; 715/764

(58) Field of Classification Search
USPC ........................................ 715/810, 761, 764
See application file for complete search history.

(56) References Cited

U.S. PATENT DOCUMENTS

| | | | |
|---|---|---|---|
| 5,797,011 A | 8/1998 | Kroll et al. | |
| 6,205,418 B1 | 3/2001 | Li et al. | |
| 7,124,357 B1 * | 10/2006 | Orr | 715/234 |
| 7,490,298 B2 * | 2/2009 | Bauman et al. | 715/788 |
| 7,536,294 B1 | 5/2009 | Stanz et al. | |
| 7,546,315 B2 | 6/2009 | Kawada et al. | |
| 7,568,157 B1 * | 7/2009 | Orr | 715/273 |
| 7,680,867 B2 * | 3/2010 | Green et al. | 707/811 |
| 8,244,043 B2 * | 8/2012 | Chang et al. | 382/218 |
| 2012/0069199 A1 * | 3/2012 | Chang et al. | 348/207.1 |
| 2012/0070090 A1 * | 3/2012 | Chang et al. | 382/218 |

* cited by examiner

*Primary Examiner* — David Phantana Angkool

(57) ABSTRACT

An method for use in a computer system for determining correspondence between at least two renditions of a single computer program includes enabling the identification of a selected screenshot related to navigation within the computer program and, as a response to the identification, accessing a reference screenshot captured during navigation within a first rendition and a corresponding screenshot captured during navigation within a second rendition. The reference screenshot and the corresponding screenshot are presented on a display, thereby enabling a same-display comparison of content of the reference and corresponding screenshots.

16 Claims, 13 Drawing Sheets

| Product | Screens | English Screens | Non-English Screens | Reviews |
|---|---:|---:|---:|---:|
| ConverterEnterpriseKL | 629 | 158 | 471 | 453 |
| ConverterKLNext | 1,363 | 342 | 1,021 | 1,024 |
| Fusion | 1,596 | 266 | 1,330 | 1,321 |
| GuidedConsolidation | 431 | 110 | 321 | 0 |
| KLNext | 10,156 | 3,229 | 6,927 | 0 |
| Vanquish | 900 | 225 | 675 | 0 |
| View | 632 | 199 | 433 | 0 |
| View-Bristol | 999 | 213 | 786 | 538 |
| Workstation | 1,833 | 924 | 909 | 0 |
| Workstation-Iron | 2,198 | 1,099 | 1,099 | 0 |
| vpx | 15,909 | 3,977 | 11,932 | 10,674 |
| Totals | 36,646 | 10,742 | 25,904 | 14,010 |

FIG. 3

| Product: Fusion | | |
|---|---|---|
| Feature | Screens | Delete |
| About Box | 6 | X |
| CustomizeToolbar | 12 | X |
| DeviceSettings | 150 | X |
| Installer | 60 | X |
| KeyboardMapping | 42 | X |
| License | 30 | X |
| manual | 168 | X |
| Menu | 96 | X |
| Message | 312 | X |
| P2V | 138 | X |
| Preferences | 66 | X |
| Snapshot | 132 | X |
| Update | 6 | X |
| Upgrade | 12 | X |
| VMCreation | 132 | X |
| VMLibrary | 24 | X |
| VMTools | 210 | X |
| Total Screens: | 1596 | |
| Total English: | 266 | |

FIG. 4

| | Home | Screens | Search | |
|---|---|---|---|---|
| | -Select a product- ▶ | -Select a feature- ▼ | | |

PRODUCT: vpx

Feature: ClusterOps_DRS_dpm

| Order | Screen Name | Total | Reviews | | | |
|---|---|---|---|---|---|---|
| | | | SC | DE | JP | |
| 1 | EnableDPMEnable_1_ClusterSummaryTabVMwareDRSPanelDPMOff_Tab | 4 | 1 | 1 | 1 | |
| 2 | EnableDPMEnable_2_ClusterSummaryTabVMwareDRSPanelDPMManual_Tab | 4 | 1 | 1 | 0 | |
| 3 | EnableDPMEnable_3_ClusterSummaryTabVMwareDRSPanelDPMAutomated_Tab | 4 | 1 | 1 | 0 | |
| 4 | ViewResourceDistributionChart_DRSResourceDistributionWindow | 4 | 1 | 1 | 0 | |
| 5 | DPMThreshold_1_EditClusterSettingsWindowPowerManagementPage | 4 | 0 | 1 | 0 | |
| 6 | DPMThreshold_2_EditClusterSettingsWindowPowerManagementPageDPMThreshold1Description | 4 | 0 | 1 | 0 | |
| 7 | DPMThreshold_3_EditClusterSettingsWindowPowerManagementPageDPMThreshold2Description | 4 | 0 | 1 | 0 | |
| 8 | DPMThreshold_4_EditClusterSettingsWindowPowerManagementPageDPMThreshold3Description | 4 | 0 | 1 | 0 | |
| 9 | DPMThreshold_5_EditClusterSettingsWindowPowerManagementPageDPMThreshold4Description | 4 | 0 | 1 | 0 | |
| 10 | DPMThreshold_6_EditClusterSettingsWindowPowerManagementPageDPMThreshold5Description | 4 | 0 | 1 | 0 | |

| | |
|---|---|
| Help | Apply priority 3 or higher recommendations<br>vCenter will apply power on recommendations produced to meet VMware HA requirements or user-specified capacity requirements.<br>Power on recommendations will also be applied if host resource utilization becomes higher than the target utilization range.<br>Power off recommendations will be applied if host resource utilization becomes very low in comparison to the target utilization range.<br><br>OK    Cancel |
| Build | 13579 |
| Date | 05/08/09 |
| User | lis |
| Steps | 1) 1. Navigate to existed DataCenter<br>2) 2. Invoke New Cluster Wizard<br>3) 3. Input valid Cluster Name<br>4) 4. Check DRS check box<br>5) 5. Click Next button to finish the Wizard<br>6) 6. Navigate to the New DRS Custer in the Inventory tree<br>7) 7. Pick Inventory > Cluster > Edit Settings...<br>8) 8. Navigate to the VMwareDRS_PowerManagement page on Edit Cluster Settings |
| Edit | X- Use Alt-J to toggle this section |

FIG. 8

| | |
|---|---|
| | Home    Screens    Search |

Screenshot Comparison Search

Enter any combination of criteria and click View Screenshots

| | |
|---|---|
| Search Word | |
| Select Product | Select Product ▶ |
| Select Screen Feature | Select feature ▶ |
| Choose from the most recent Build IDs | Select build ▶ |
| Select User | Select user ▶ |
| Select Language | ⊙EN ○DE ○ES ○FR ○IT ○JP ○SC |
| Select Date | From Jul▶ 17▶ 2008 🗓<br>To Dec▶ 17▶ 2009 🗓 |
| Select Screenshot Size | ⊙300 ○450 ○600 |

View Results | Start New Search

FIG. 11

SAME-DISPLAY COMPARISON OF CONTENT FOR DIFFERENT RENDITIONS OF A SINGLE COMPUTER PROGRAM

BACKGROUND OF THE INVENTION

It is common for a commercially successful computer program to undergo a number of different renditions. For example, the computer program may be upgraded from its initial version (Version 1.0) to a more powerful version (Version 2.0). A change in the version of an operating system will often necessitate the generation of another rendition of the program. Another type of rendition change occurs when the computer program is translated from one human language to another human language, such as a translation from English to Japanese. More significant changes are necessary if the computer program is expanded for operation within a second operating system, such as the first rendition for use in a Windows environment and a second rendition for use within a Linux environment.

For each of these types of rendition changes, consistency in the content presented to a program user is a consideration. The visual content may be presented in a number of different content objects, such as dialog boxes, list boxes, error messages, pop-up menus, pull-down menus, and other application windows.

Consistency in the content of such content objects is perhaps given the greatest attention in the area of providing translations. In addition to linguistic differences, translations may involve differences in the systems of measurements, differences in currency, and a number of other possible locale-specific variations. For example, a dialog box that is sufficiently large to display English terms may be insufficient to display such terms in a another language. There is a wide range of potential defects that can arise when the program is changed from an original rendition to an alternative rendition.

The translation and localization of a computer program may require a team of individuals, particularly if the program is highly sophisticated. In addition to expertise in the relevant languages and localization considerations, programming expertise is often required. While there do exist tools to assist programmers tasked with the responsibility of creating alternative language renditions of a program, errors nevertheless occur. To address these errors, alternative language renditions of a computer program often go through quality assurance (QA) testing that focuses on accuracy in language translations prior to their release. Additionally, customer support is made available for addressing the problems that occur as a result of any errors that are not detected and corrected during the quality assurance testing.

The quality assurance testing is typically performed manually. For example, quality assurance personnel may carefully and thoroughly run an alternative language rendition of a program and review every content object and other aspect of the program which was affected by the translation process. This review requires sufficient hardware resources, both the original and alternative language renditions of the program, and familiarity with the workings of the program in order for the review to produce accurate and correct results. Hiring quality assurance personnel, possibly in remote locations, in order to take advantage of language expertise and then providing such personnel with sufficient hardware resources and training such personnel to become familiar with the program can be very expensive and time-consuming. The need to be familiar with the workings of the program may be reduced by allowing quality assurance personnel to simultaneously execute multiple renditions of the program and visually compare results, such as a comparison of the help menus of the original rendition and the alternative language program. However, simultaneously executing multiple renditions of a program becomes less cost efficient as the sophistication of the program increases, such as with virtualization products that may require the cooperation of multiple servers in order to properly execute.

In contrast to the purely manual techniques for quality assurance of alternative language renditions, testing of other aspects of a program can currently be done in an automated process. For example, SilkTest® from Borland Software Corporation is a software tool for testing functional aspects of software applications. Such automated testing can significantly reduce the required time for preparing a program for end users. Moreover, since automated testing can be performed without human intervention, costs are reduced and it is possible to record every action in case of a failure. The use of automation more readily allows extensive variations in the testing of each program feature.

SUMMARY OF THE INVENTION

An method for use in a computer system for determining correspondence between at least two renditions of a single computer program includes enabling the identification of a selected screenshot related to navigation within the computer program and, as a response to the identification, accessing a reference screenshot captured during navigation within a first rendition and a corresponding screenshot captured during navigation within a second rendition. The reference screenshot and the corresponding screenshot are presented on a display, thereby enabling a same-display comparison of content of the reference and corresponding screenshots.

BRIEF DESCRIPTION OF THE DRAWINGS

FIG. 3 is an exemplary table of available products for selection within the process of FIG. 2.

FIG. 4 is a table of features of a selected product from FIG. 3.

FIG. 5 is another type of table showing quality assurance information for another program product from the table of FIG. 3.

FIG. 7 is similar to FIG. 6, but with an alternative corresponding screenshot.

FIG. 8 shows possible content that may be below the side-by-side screenshots of FIGS. 6 and 7.

FIG. 11 is an illustration of a graphical user interface for searching available screenshots.

DETAILED DESCRIPTION

Figure 1A:
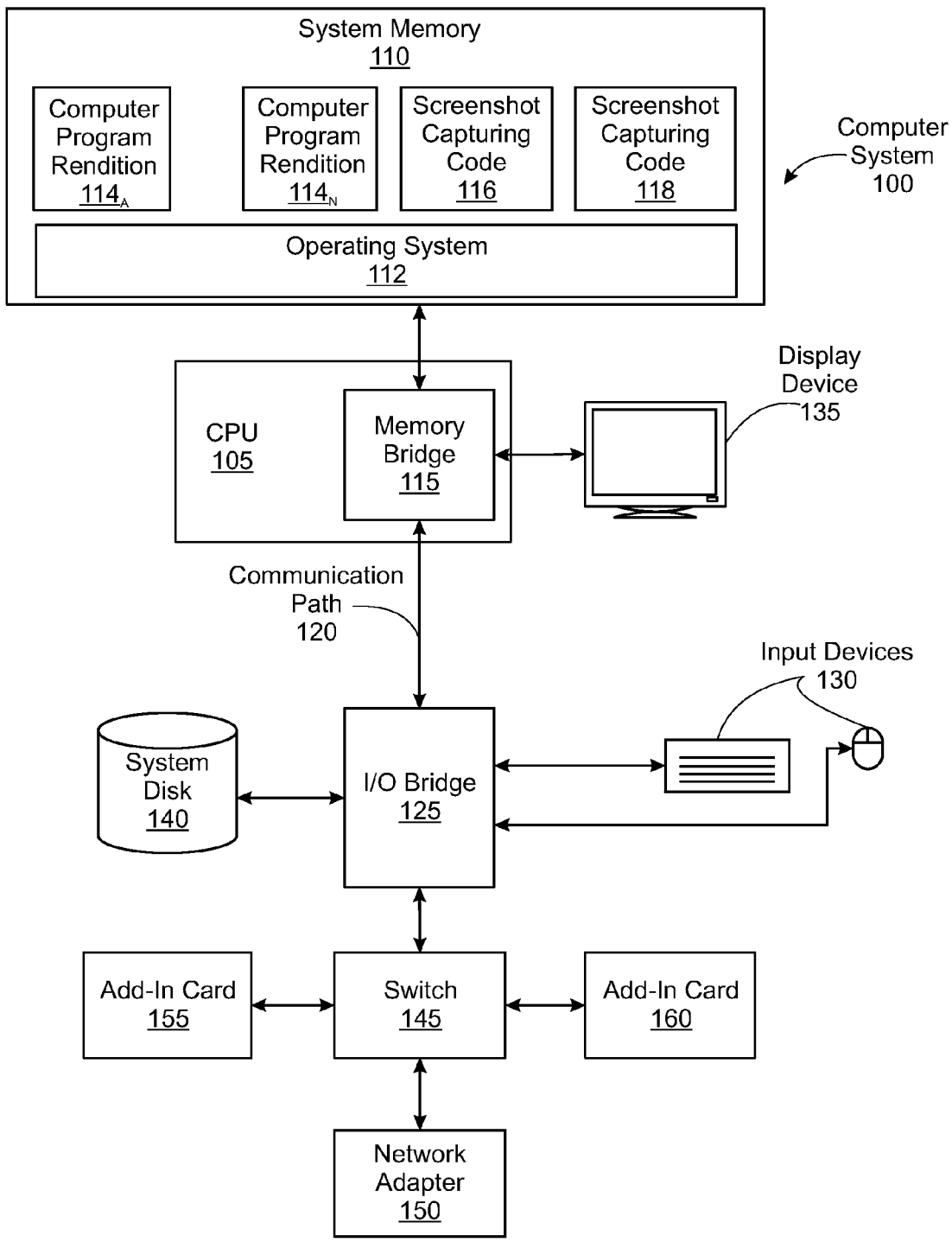
FIG. 1A depicts a block diagram of a computer system in which an embodiment of the present invention may be implemented.

FIG. 1A depicts a block diagram of a computer system in which an embodiment of the present invention may be implemented. Computer system 100 includes a CPU 105 and a system memory 110. System memory 110 includes an operating system 112 upon which various computer programs or applications may be executed. For example, various renditions of a computer program $114_A$ to $114_N$ may be executed in computer system 100. System memory further includes screenshot acquiring code 116 and screenshot comparison code 118, as further discussed below. System memory 110 communicates via a bus path that includes a memory bridge 115, which may be, for example, a northbridge chip, which is further connected via a bus or other communication path 120 (e.g., a HyperTransport link) to an I/O (input/output) bridge 125. I/O bridge 125, which may be, for example, a southbridge chip, receives user input from one or more user input devices 130 (e.g., keyboard, mouse, etc.) and forwards the input to CPU 105 via communication path 120 and memory bridge 115. CPU 105 produces output for display on display device 135 (e.g., an LCD based monitor, etc.). A system disk 140 is also connected to I/O bridge 125. A switch 145 provides connections between I/O bridge 125 and other components such as a network adapter 150 and various add in cards 155 and 160. Other components (not shown), including USB or other port connections, CD drives, DVD drives, film recording devices, and the like, may also be connected to I/O bridge 125. Communication paths interconnecting the various components in FIG. 1A may be implemented using any suitable protocols, such as PCI (Peripheral Component Interconnect), PCI Express (PCI E), AGP (Accelerated Graphics Port), HyperTransport, or any other bus or point to point communication protocol(s), and connections between different devices may use different protocols as is known in the art. It should be recognized that alternative computer systems and general-purpose computers to that of FIG. 1A may be used consistent with the teachings herein. For example, rather than a single computer system as depicted in FIG. 1A, an alternative embodiment may utilize one computer system that includes computer program renditions $114_A$ to $114_N$ and screenshot capturing code 116 and another computer system that includes screenshot capturing code 118.

Figure 1B:
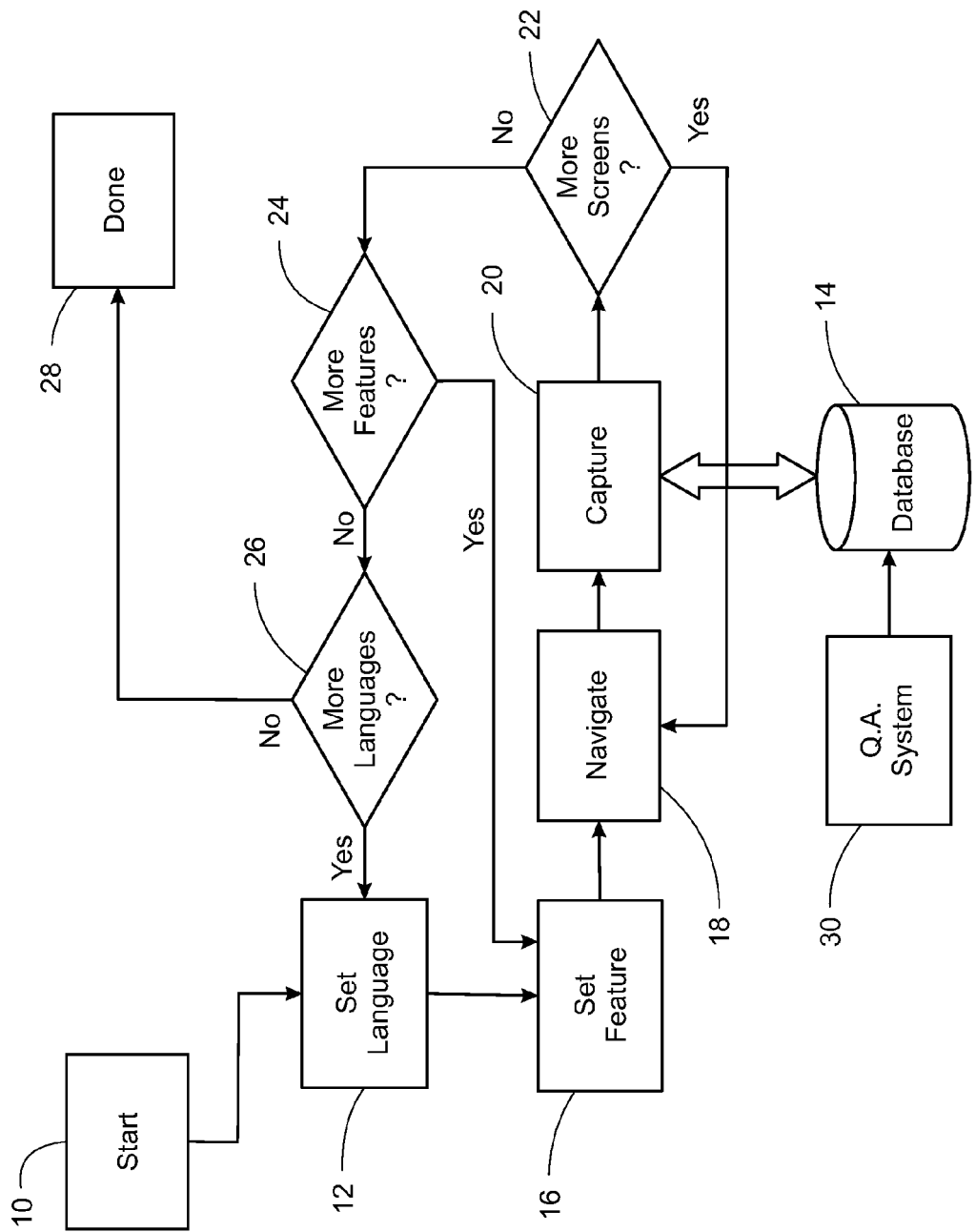
FIG. 1B is one embodiment of a process flow of steps for acquiring screenshots to be used by a quality assurance (QA) system.

FIG. 1B illustrates one embodiment for accumulating and utilizing screenshots to be used by a quality assurance system. As used herein, a "screenshot" is defined as an image file of display information, typically the information that is presented to a user of a computing system via a display of the system. The screenshot may be an image of an entire or a specific region, such as a content object. Content objects of interest may include menus, list boxes, error messages, dialog boxes, and other application windows which present content to the users of a program.

The following description will primarily refer to situations in which a program has undergone localization, particularly human language translation. However, the techniques may be applied to content comparisons of two versions (such as an original version and an upgraded version) of a program within a single language or to content comparisons for a program designed for use in more than one operating system environment.

Figure 2:
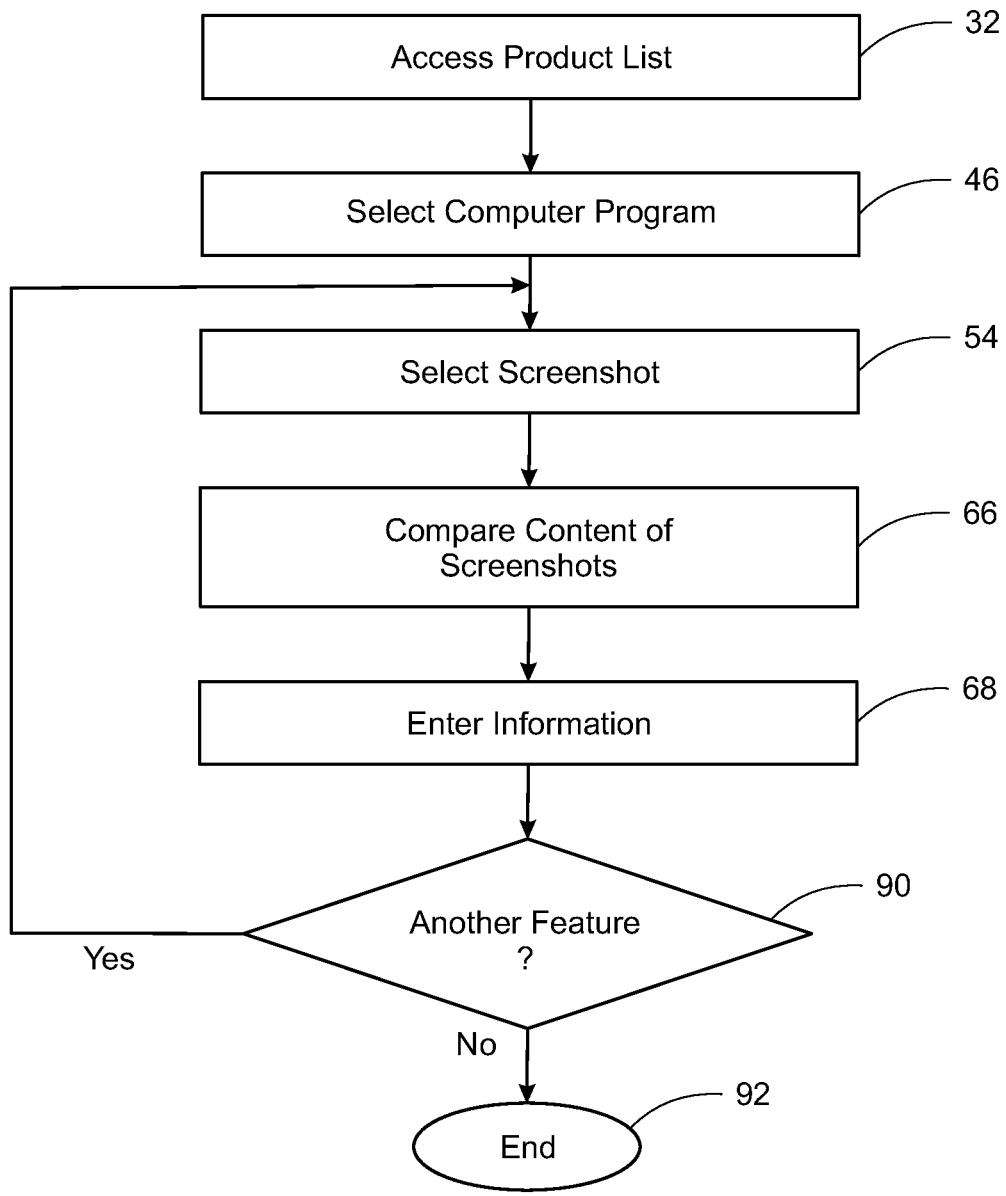
FIG. 2 is an embodiment of a process utilized by the quality assurance system of FIG. 1B.

The process of FIG. 1B relates primarily to acquiring and storing the screenshots. In one embodiment, the process of FIG. 1B may be implemented within screenshot acquiring code 116. On the other hand, FIG. 2 illustrates a process for utilizing screenshots which were previously captured, for example, as a result of the process in FIG. 1B. In one embodiment, the process of FIG. 2 may be implemented within screenshot comparison code 118. The benefits of the two processes are maximized if they are used in combination, but each process provides benefits independent of the use of the other process.

In one embodiment, upon completion of an initial translation of a computer program from a source rendition to an alternative language rendition, the process represented in FIG. 1B can be initialized at start step 10. As further described below, the process involves analysis of both renditions, if screenshots are to be used for content comparisons. Therefore, the relevant language is set at step 12. As one example, "English" may be set when the process first reaches step 12 if the source rendition utilizes English, but "German" may be set after desired English screenshots have been captured for the source rendition and the process returns to step 12, as further detailed below.

In one embodiment, screenshot acquiring code 116 which implements the process of FIG. 1B may take the form of a script used to acquire the screenshots and store them within a database 14. It should be recognized, however, that alternative embodiments may implement screenshot acquiring code 116 as a separate standalone application from the computer program, as a separate process or thread of the computer program itself, as a plug-in component of the computer program itself, or through any other similar or known methods or techniques to interact or add functionality to an existing computer program. A systematic navigation through the program's various "features" in order to acquire and store such screenshots is also controlled by the script. For example, in one embodiment, such features may comprise various graphical user interface (GUI) panels, forms, buttons, bars, buttons, boxes, menus, dialogs and other such widgets. In steps 16 and 18, a particular feature of the program under test is set and the program navigates accordingly. As one example, the "Help" feature may be selected, causing the program to navigate to a display of a Help menu. A screenshot is then captured at step 20. The captured screenshot is labeled in a manner that allows the screenshot to be identified and distinguished from other screenshots. It should be recognized that thousands of screenshots may be acquired for a single program. Furthermore, it should be recognized that in certain embodiments, a screenshot may be captured by the implementing software (e.g., script, standalone application, plug-in component, etc.) without having the computer program actually display such a screenshot on a physical display. In such embodiments, FIG. 1B may, for example, be executed as a background process and screenshots may be captured without physical display by, for example, redirecting display output from the computer program into a memory buffer allocated by the implementing software.

For some program features, it may be necessary to capture more than one screenshot in order to acquire images of all of the content that is available for display to the end user of the program under such a feature. For example, given a particular physical display size of a computer system in which the process of FIG. 1B is running (or which is otherwise assumed by the script, for example, if the process simply runs as a background process), the number of items or entries in a Help menu may require "scrolling" in order to display every entry in the menu. In such a scenario, more than one screenshot of the Help menu may be needed to capture the display of every entry in the menu. In another scenario, the Help menu itself may have multiple tiers or levels of sub-menus such that more than one screenshot is needed to traverse the entirety of sub-menus, entries, panels and other program features that may be exposed or displayed during a navigation of the Help menu.

At decision step 22, the process determines whether such additional screenshots are required for the current feature. If an affirmative determination is reached, the process returns to navigation step 18, so that the program is able to display any such additional content and additional screenshots are captured.

If a negative determination is reached at step 22, the determination is made as to whether there are any additional program features relevant to capturing screenshots of display content. This determination is made at decision step 24. For example, many programs include a top-level menu bar that comprises a number of pull-down menus along the upper edge of an application window. An affirmative determination may be made at step 24 until all such pull-down menus and other content objects of the relevant program features have been captured as screenshots. In one embodiment, at the least, all content objects which may be significant to quality assurance personnel should be captured in screenshots.

When all relevant features of the program have been processed, a negative response will occur at decision step 24. The process then proceeds to a determination of whether an additional pass is of interest. This occurs at step 26. If the program is available in more than one language rendition (e.g., German, as discussed above), the process will return to step 12 and the designation of the language will be changed. The processing to be described with reference to FIG. 2 may be implemented if there is more than one rendition of a program. For each rendition, screenshots are captured at step 20 and are designated accordingly. In one embodiment, the script navigates the different language renditions of the program in the same systematic manner such that corresponding screenshots for each language rendition will be stored in database 14. That is, for each menu or other content object of the program, there will be corresponding screenshots for each of the renditions.

When all of the available renditions have undergone processing, the script is terminated at step 28. The storage of screenshots within database 14 is then available for accessing by a quality assurance system 30. Quality assurance system 30 is a computing system that is capable of executing the steps shown in FIG. 2. For example, quality assurance system 30 may be a workstation or other computer system that includes screenshot comparison code 118. In one embodiment, screenshot comparison code 118 is a standalone application running on the workstation which also has access to database 14. In an alternative embodiment, screenshot capturing code 116 and screenshot comparison code 118 may comprise the same application and may run on the same computer system, such as FIG. 1A. As such, it should be recognized that quality assurance system 30 may be the same or a different computing system from the computing system has been implemented to execute the steps in FIG. 1B (e.g., via screenshot capturing code 116).

In the embodiment of FIG. 2, an initial step 32 for comparing content of corresponding screenshots is to access a product list of different computer programs for which screenshots are available, either using the techniques described above or other techniques. FIG. 3 is an example of a product list of eleven possible programs. The first column 34 within table 36 identifies the programs. The second column 38 is the number of screenshots accessible for the particular program. For purposes of explanation, the source language will be considered to be English. Thus, the third column 40 is the number of reference screenshots of the source rendition (i.e., English rendition) that have been captured and stored, while the next column 42 identifies the number of corresponding screenshots in alternative language renditions. For example, there are 266 reference screenshots and 1,330 corresponding screenshots for the program Fusion indicating the existence of five alternative language renditions of the program. This is a one-to-one correspondence of the reference screenshots and the corresponding screenshots for each of the five languages, but discrepancies can occur. If, for example, the process of FIG. 1B analyzes a new alternative language rendition for the Fusion program, an additional 266 screenshots would be captured and stored in database 14 and column 42 would reflect a total of 1,596 screenshots. The final column 44 identifies the number of non-English screenshots which have been reviewed at a particular point in time by quality assurance personnel.

Returning to FIG. 2, a particular computer program is then selected from table 36, as indicated at step 46. For example, the Fusion program is selected at step 46. This selection may generate the table shown in FIG. 4. The table in FIG. 4 identifies various available features of the program and the number of screenshots that relate to each feature (columns 48 and 50, respectively).

The listing of program features within column 48 is a broad representation of the Fusion features. For example, during navigation of Fusion in the process of FIG. 1B, an "Installer" feature was set in step 16 by the script relating to installation of the program. Sixty screenshots were captured during the navigation of the program through the installation. In comparison, less content is presented to a user of the program when the script navigates the "About Box" feature of the program, so that only six screenshots were captured and stored. As an alternative to the broad listing of features, an identification of the individual screenshots may be presented to the user upon selection of the Fusion program.

FIG. 5 shows one possible graphical user interface that may be available upon selection of a particular feature for a program presented in FIG. 4. Rather than relating to the Fusion program, FIG. 5 relates to screenshots available for a particular feature (Cluster Operations) of a different product shown in FIG. 3, the VPX program. Ten screenshots are shown as being available for this program feature (column 52). In the columns to the right of the ten screenshot identifications, it can be seen that there are four language renditions of the VPX program and that only a portion of the screenshots has been currently reviewed for quality assurance purposes. As depicted, in addition to an English source rendition, the program is available three alternative language renditions in Chinese (SC), German (DE) and Japanese (JP).

With respect to the first of the ten available screenshots, each of the three non-English screenshots has been compared in content with the corresponding screenshot of the English rendition. However, for the sixth screenshot, the Chinese language screenshot has not been compared to the English screenshot. Referring briefly to FIG. 2, in one embodiment, step 54 for selecting a screenshot is effectuated by selecting one of the screenshots in FIG. 5 to initiate the content comparison. For example, the screenshots may be assigned Universal Resource Locators (URLs) that allow a reviewer to display the screenshots within a conventional browser (such as the Internet Explorer browser available through Microsoft Corporation) or other web application. As depicted in FIG. 5, each of the screenshot identifiers within column 52 may be a hyperlink to its described screenshot. As another or additional possibility, the numbers within the Reviews columns may also be hyperlinks, so that selecting the "1" or "0" within the column automatically launches both the reference screenshot (English) and the corresponding screenshot of the alternative language rendition (Chinese, Germany, or Japanese).

Figure 6:
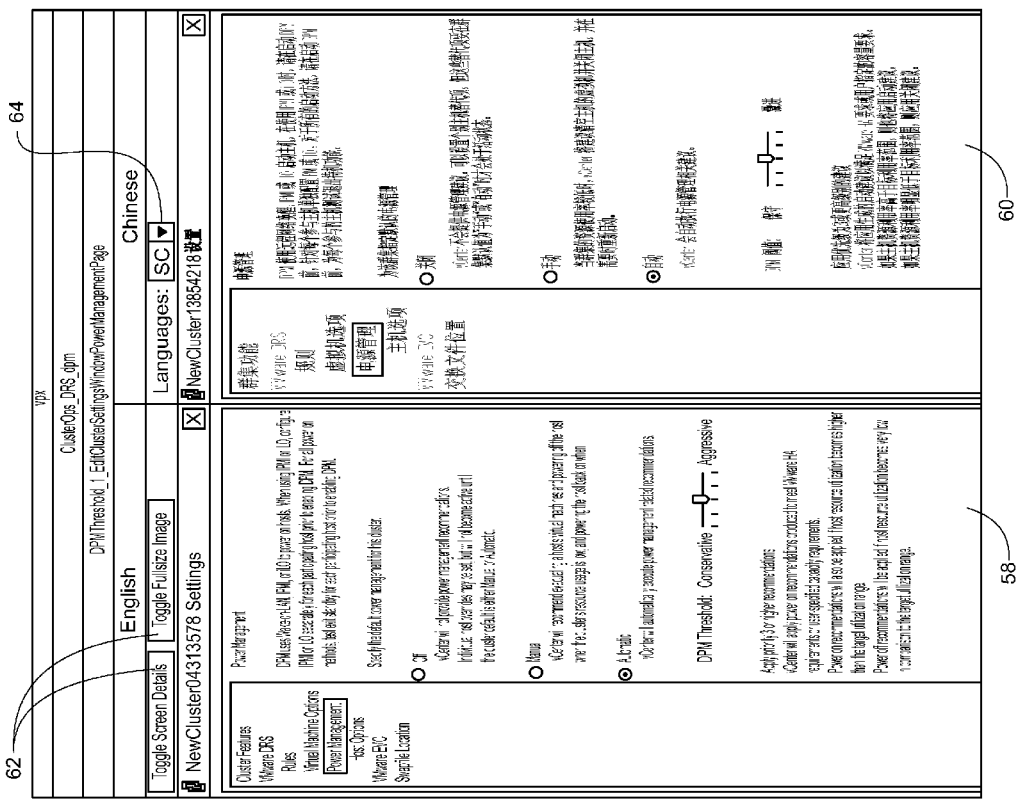
FIG. 6 is an illustration of a side-by-side comparison of a reference screenshot and a corresponding screenshot of a different language.

In FIG. 6, the sixth screenshot of FIG. 5 has been selected for content comparison of the English and Chinese renditions.

While it may be helpful for quality assurance personnel to have expertise within the VPX program (i.e., the program related to the screenshots), the quality assurance personnel can still perform content comparisons without an in depth understanding of how to navigate or use the program itself. That is, expertise in the program is not a requirement in an embodiment since navigation of the program itself is not needed to reach screenshots for performing content comparison.

To facilitate content comparison, reference screenshot 58 and corresponding screenshot 60 are shown in a side-by-side relationship. Thus, the corresponding information within the two screenshots is generally aligned.

Figure 7:
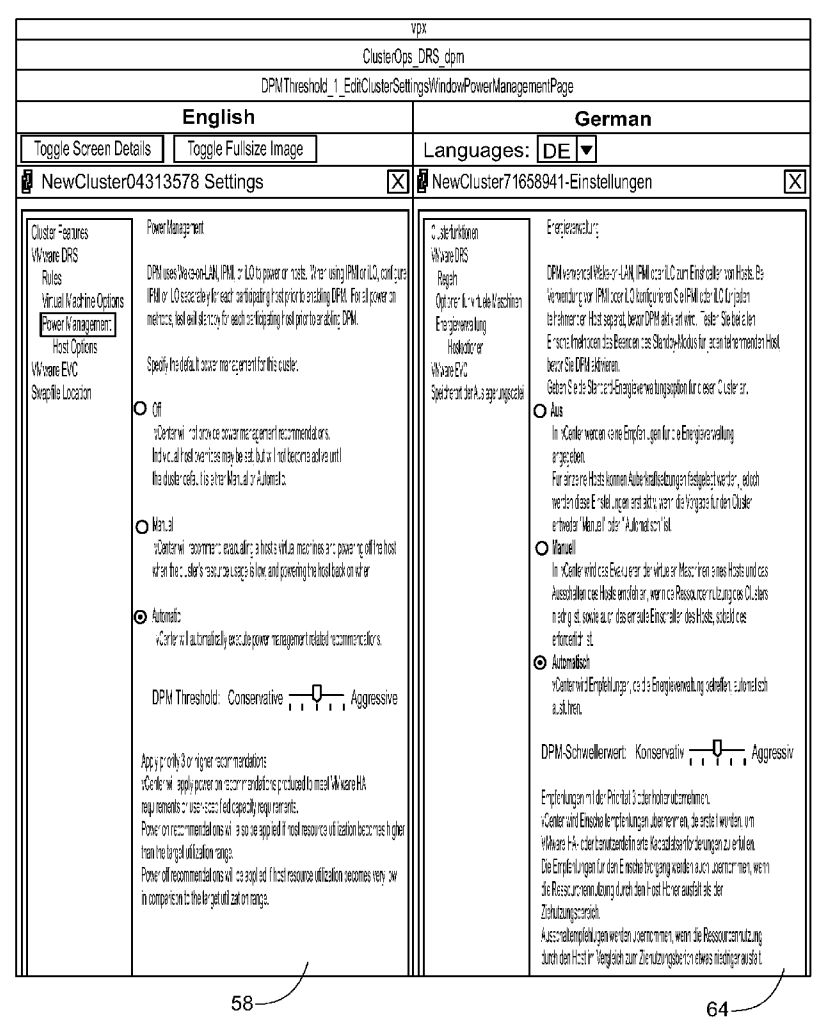

Within the user interface depicted in FIG. 6, it is possible to toggle between either the display of all of the possible information or a "full screen" presentation. This is possible by use of the browser buttons 62. Additionally, if the program has been translated into more than one language since the original rendition, there is a pull-down menu that appears by selecting the drop-down menu 64. Thus, a quality assurance reviewer may easily change the right-side portion of the display from the Chinese screenshot 60 to the German screenshot 65, as indicated in FIG. 7. As in FIG. 6, the German corresponding screenshot 65 as depicted in FIG. 7 is in a side-by-side relationship with the English reference screenshot 58.

Returning to FIG. 2, the content comparison of the reference and corresponding screenshots occurs at step 66. Based upon the correspondence between the two screenshots, information is entered at step 68. In one embodiment, such information may comprise an indication of whether errors exist in the alternative language screenshot. However, it should be recognized that alternative embodiments may provide other or additional means to annotate the displayed screenshots or otherwise enter additional information within other portions of the display, so as to assist others, such as debuggers and programmers assigned to correct any errors that are discovered.

Figure 9:
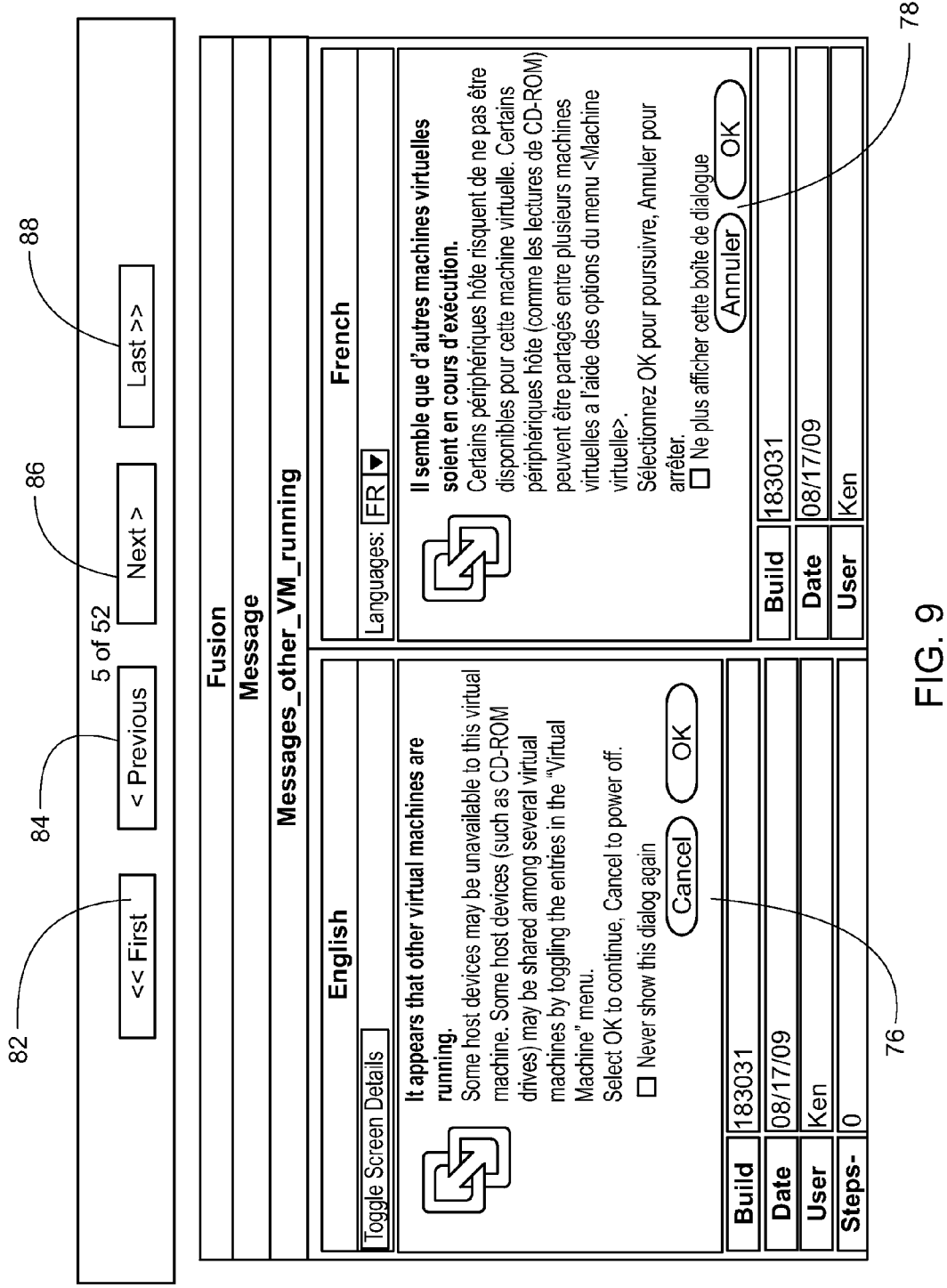
FIG. 9 is another implementation of the side-by-side screenshots of reference and corresponding screenshots.
Figure 10:
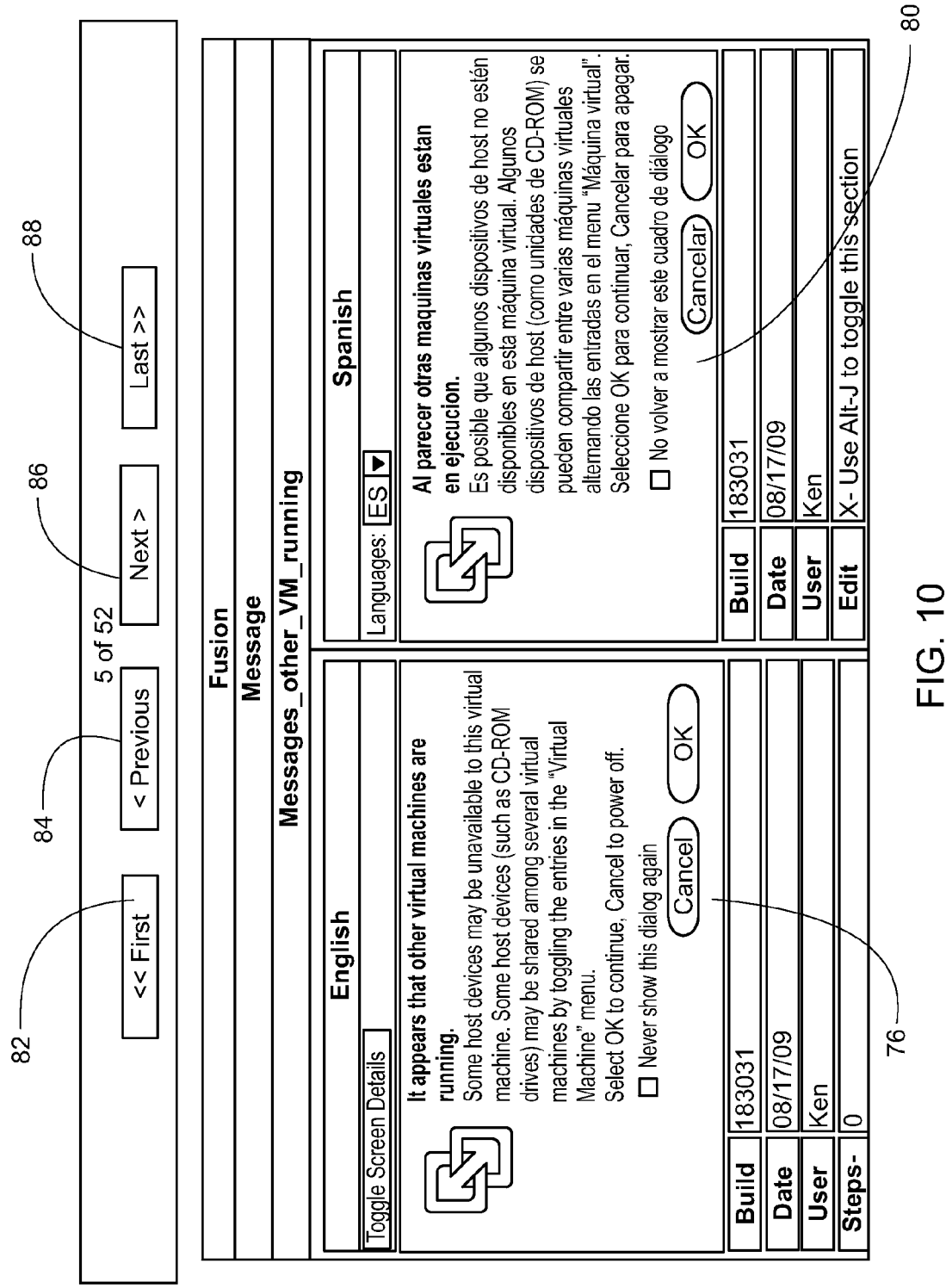
FIG. 10 is similar to FIG. 9, but with the corresponding screenshot being specific to the Spanish rendition.

In FIG. 8, a table is presented below reference screenshot 58. Table 70 includes a build number, a date, a "user" (such as the quality assurance reviewer), the steps within the VPX program which were navigated in order to reach the reference screenshot, and an edit field. By interacting with interfaces similar to those of FIGS. 6, 7, and 8, any quality assurance reviewer can access a database having annotated or non-annotated images, can review the screenshots, can add comments, and can easily report defects against specific screenshots. The side-by-side screenshots may be loaded and presented with a single "click." Then, other languages can be accessed by using the pull-down menu 64 shown in FIG. 6. FIG. 5 also illustrates an embodiment in which pull-down menus enable a quality assurance reviewer to quickly and easily navigate through the storage of screenshots for the different program products of a company. Using pull-down menus 72 and 74, the designation of the program and the selection of the feature within the designated program are changed. FIGS. 9 and 10 illustrate the same-screen, side-by-side presentation of an English reference screenshot 76 and either a French corresponding screenshot 78 or a Spanish corresponding screenshot 80 wherein the presentation includes additional navigational buttons for a quality assurance reviewer. As depicted, four buttons 82, 84, 86, and 88 allow the quality assurance reviewer to maneuver through the available screenshots.

As previously noted, screenshot comparisons may be used in rendition changes other than language based rendition changes. For example, the screenshots of an original release of the program may be compared to the screenshots of an upgraded version of the same program. As another example, the program may be adapted for different operating systems and the screenshots of the two renditions may be compared to ensure content correspondence, if desired. As another alternative to the process as described above, the reference screenshot may be selectable. That is, as an alternative to the embodiment of FIGS. 9 and 10 in which the reference screenshot 76 is not replaceable, pull-down menus or other selection mechanisms may be used to change either or both of the reference screenshot 76 and the corresponding screenshot 78 and 80.

Referring again to FIG. 2, after the reference and corresponding screenshots have been compared at step 66 and any relevant information has been entered at step 68, the decision is made as to whether another comparison is to take place. If a reviewer intends to progress to another feature at decision step 90, the process returns to the step 54 of selecting the relevant screenshot. However, when the screenshots of all relevant features have been compared, a negative response occurs at step 90 and the process ends 92.

Figure 12:
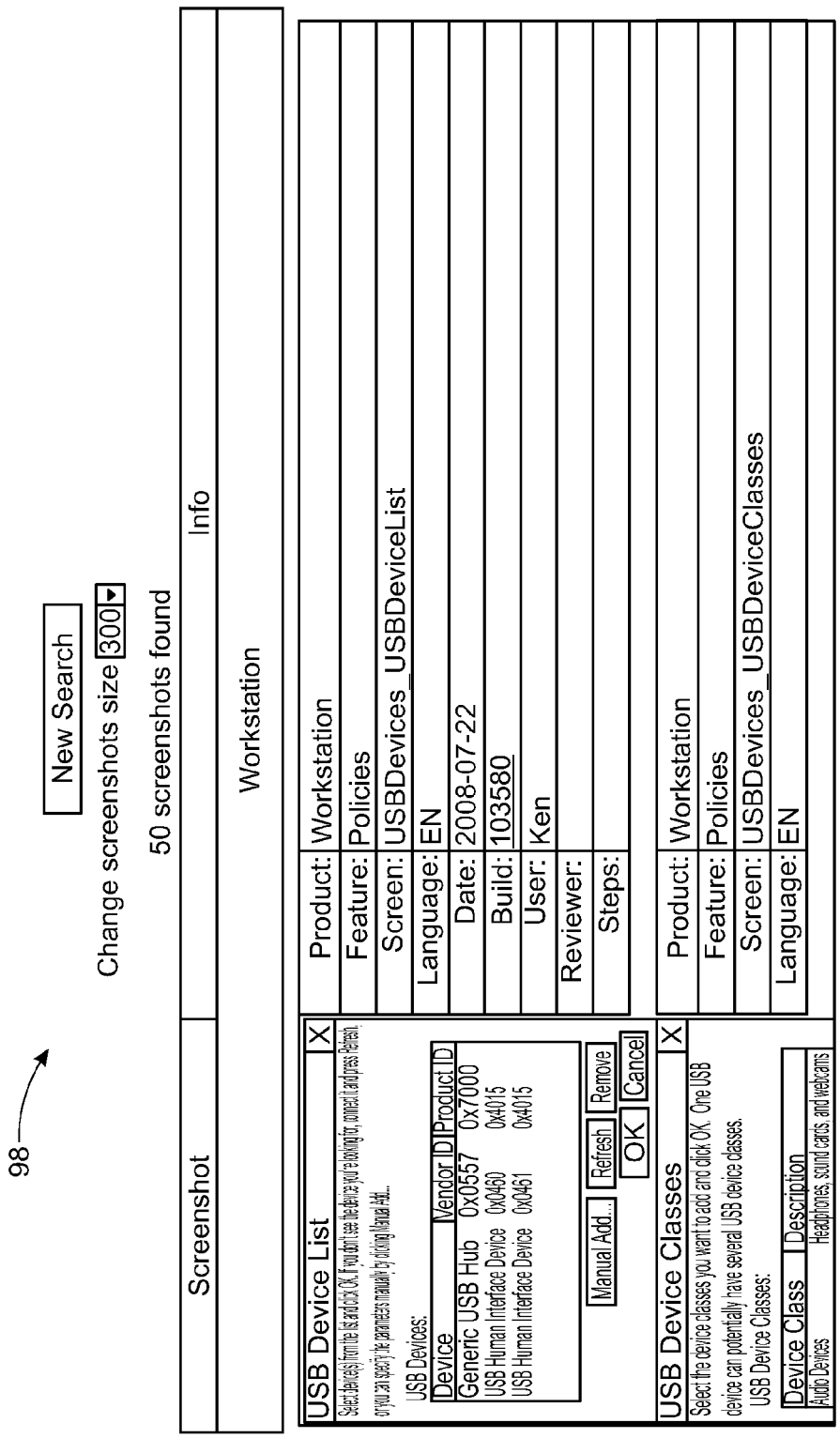
FIG. 12 illustrates the results of a search for screenshots using the term "USB", where the search term is entered by a person using the graphical user interface of FIG. 11.

The automated storage of screenshots as described with reference to FIG. 1B also allows product designers and others to easily discover and examine content presentation for particular features as provided within other products of the company. A greater consistency of screen content among programs available from a single company is promoted by enabling a quick review of past and current programs during the development of a new program. Again, this content discovery is possible without the need to set up the operation of the past program or the need to execute the steps required in navigating to the screen. Advanced search capabilities allow the product designers to search for screenshots by entering only a portion of the screen name, making it possible to find all relevant screens from all products of the company. Also similar to the embodiment described above, web applications may be utilized by the searchers. FIG. 11 illustrates an embodiment of a graphical user interface 94 for a search engine. A term, such as "USB", may be entered into field 96. The search may be narrowed on the basis of product, screen feature, build identifications, the user, the language, or a specific range of dates. FIG. 12 illustrates the presentation 96 of the search results when "USB" is entered into field 96. Fifty screenshots relevant to the term USB" were discovered. Company-wide standards on screen and feature naming improve the ability of users to locate all relevant screens.

Another selection within FIG. 11 relates to the screenshot size. This option is helpful, for example, in embodiments in which the searching occurs using a web application that enables remote access. Smaller displays will load more quickly. Then, if details are required, the size may be reselected, as shown in the search results of FIG. 12. The expansion and contraction of the displayed screenshot may be implemented by configuring each image as a hyperlink to its larger-sized or smaller-sized image of the same content.

It should be recognized that various modifications and changes may be made to the specific embodiments described herein without departing from the broader spirit and scope of the invention as set forth in the appended claims.

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. In a computer system, an method of determining correspondence between at least two renditions of a single computer program comprising:

enabling identification of a selected screen related to navigation within a computer program wherein enabling identification of the selected screen includes enabling user input of an identification of a specific feature of the computer program, the reference screenshot being a capture of instance image data generated during running of the first rendition of the computer program when the specific feature is invoked, the corresponding screenshot being a capture of instance image data generated during running of the second rendition when the specific feature is invoked;

in response to the identification, accessing a reference screenshot captured during navigation within a first rendition of the computer program and a corresponding screenshot captured during navigation within a second rendition of the computer program; and presenting both the reference screenshot and the corresponding screenshot on a display, thereby enabling a same-display comparison of content of the reference and corresponding screenshots.

2. The method of claim 1 further comprising automated acquisition and storage of a plurality of reference screenshots during the navigation within the first rendition and automated acquisition and storage of a plurality of corresponding screenshots during the navigation within the second rendition, the acquisitions being based upon capturing each content object intended for display to an end-user of the computer program, the content objects including menus.

3. The method of claim 1 wherein the second rendition of the computer program is a human-language translation of the first rendition.

4. The method of claim 3 further comprising enabling designation of a particular human language from among a plurality of human languages to which the computer program has been translated, the designation thereby identifying the second rendition.

5. The method of claim 1 wherein accessing and presenting the reference and corresponding screenshots are executed independently of operations either by or upon the computer program.

6. The method of claim 5 wherein accessing the reference and corresponding screenshots includes accessing a storage of screenshots systematically captured during automated processing in navigations within the first rendition and within the second rendition.

7. The method of claim 6 wherein accessing the storage includes accessing Universal Resource Locators (URLs) uniquely assigned to each screenshot in the storage.

8. The method of claim 1 wherein presenting both the reference and corresponding screenshots includes fixing the screenshots in a side-by-side relationship on the display.

9. The method of claim 8 further comprising displaying a sequence of execution steps related to running the computer program, wherein the sequence of execution steps identifies program navigation for display of the content of the reference and corresponding screenshots, the displaying of the sequence being simultaneous with and adjacent to the presenting of both the reference and corresponding screenshots.

10. The method of claim 9 further comprising enabling user inputs indicative of correlations between the content of the reference and corresponding screenshots and associating the user inputs with the screenshots for subsequent access.

11. The method of claim 8 further comprising presenting a menu of alternative corresponding screenshots which correspond to the reference screenshot but were captured during navigations within further renditions of the computer program.

12. A non-transitory machine readable storage medium embodying computer software, the computer software causing a computer to perform a method, the method comprising:

recognizing user inputs as identifications of selected screens accessible as a consequence of navigation within a computer program of interest wherein the identifications of the selected screens includes enabling user input of an identification of a specific feature of the computer program, the reference screenshot being a capture of instance image data generated during running of the first rendition of the computer program when the specific feature is invoked, the corresponding screenshot being a capture of instance image data generated during running of the second rendition when the specific feature is invoked;

accessing and displaying a specific reference screenshot as a response to recognition of a user input identifying a selected screen related thereto, the specific reference screenshot being a capture from a prior navigation within a first rendition of the computer program; and accessing and displaying, with the specific reference screenshot and as a response to the recognition of the user input, a corresponding screenshot which is accessible as a consequence of corresponding captures during prior navigation within a second rendition of the computer program of interest, the specific reference screenshot and the corresponding screenshot being on a same display to enable a same-display comparison of content of the specific reference and corresponding screenshots.

13. The non-transitory machine readable storage medium of claim 12 wherein the first and second renditions are different human-language translations of the computer program of interest.

14. In a computer system, a method comprising:
at least partially controlling systematic navigation within a computer program under test by use of a screen capture script;
capturing reference screenshots of content objects by automated processing of the screen capture script, the content objects including menus available upon navigation within the computer program under test;
assigning a unique identifier to each of the reference screenshots;
storing the reference screenshots such that each reference screenshot is accessible on a basis of the unique identifiers and
using the screen capture script to control systematic navigation within a second rendition of the computer program under test, so as to capture corresponding screenshots of the content objects, thereby enabling subsequent comparisons of the reference screenshots against the corresponding screenshots.

15. The method of claim 14 further comprising linking each reference screenshot with the corresponding screenshot of the same content object, such that each linked reference and corresponding screenshot is displayed in unison on a single display.

16. The method of claim 14 wherein assigning the unique identifier to each of the reference screenshots includes assigning the identifiers as Universal Resource Locators (URLs) to each pair that is defined by one of the reference screenshots and its corresponding screenshot, thereby enabling direct access to each pair of reference and corresponding screenshots.

* * * * *